(12) United States Patent
Comte et al.

(10) Patent No.: US 10,899,078 B2
(45) Date of Patent: Jan. 26, 2021

(54) SURFACE TREATMENT METHOD FOR OBJECTS

(71) Applicant: SCULPTEO, Villejuif (FR)

(72) Inventors: Myrtille Comte, Maisons-Laffitte (FR); Rima Ould Mohand Lemmouchi, Vitry sur Seine (FR); Clément Moreau, Clamart (FR)

(73) Assignee: SCULPTEO

( * ) Notice: Subject to any disclaimer, the term of this patent is extended or adjusted under 35 U.S.C. 154(b) by 0 days.

(21) Appl. No.: 16/167,777

(22) Filed: Oct. 23, 2018

(65) Prior Publication Data

US 2019/0118473 A1    Apr. 25, 2019

(30) Foreign Application Priority Data

Oct. 24, 2017  (FR) ...................................... 17 60026

(51) Int. Cl.
| | |
|---|---|
| *B29C 64/30* | (2017.01) |
| *B81C 1/00* | (2006.01) |
| *B33Y 40/00* | (2020.01) |
| *B29C 71/02* | (2006.01) |
| *C08J 7/14* | (2006.01) |
| *B29C 71/00* | (2006.01) |
| *B33Y 70/00* | (2020.01) |
| *B29K 677/00* | (2006.01) |
| *B29C 64/35* | (2017.01) |

(52) U.S. Cl.
CPC .......... *B29C 64/30* (2017.08); *B29C 71/0009* (2013.01); *B29C 71/02* (2013.01); *B33Y 40/00* (2014.12); *C08J 7/14* (2013.01); *B29C 64/35* (2017.08); *B29K 2677/00* (2013.01); *B29K 2995/0073* (2013.01); *B33Y 70/00* (2014.12)

(58) Field of Classification Search
None
See application file for complete search history.

(56) References Cited

U.S. PATENT DOCUMENTS

| | | | |
|---|---|---|---|
| 2009/0280649 A1* | 11/2009 | Mayer | B23H 5/08 438/676 |
| 2010/0098910 A1* | 4/2010 | Naritomi | B32B 7/12 428/141 |

(Continued)

FOREIGN PATENT DOCUMENTS

| | | | |
|---|---|---|---|
| DE | 112014002879 T5 * | 4/2016 | ......... B29C 71/0009 |
| FR | 772239 | 10/1934 | |

(Continued)

OTHER PUBLICATIONS

Preliminary Search Report for French Application FR 1760026 dated Jul. 10, 2018.

*Primary Examiner* — Shahmim Ahmed
(74) *Attorney, Agent, or Firm* — Perman & Green, LLP

(57) ABSTRACT

A surface treatment method of an object, including the following steps immersion of the object in a solution containing an acid or a mixture of acids, and having a pH between 0 and 6, so as to impregnate the surface of the object, removal of the object from the acid solution, and heating of the object to a temperature between 50° C. and the melting temperature of the object, until the required gloss and roughness surface properties are obtained, the method is particularly but not exclusively applicable to objects derived from additive manufacturing techniques.

14 Claims, 1 Drawing Sheet

(56) References Cited

U.S. PATENT DOCUMENTS

| | | | |
|---|---|---|---|
| 2011/0008644 A1* | 1/2011 | Naritomi | B29C 45/14311 |
| | | | 428/612 |
| 2012/0088110 A1* | 4/2012 | Elia | C23C 18/22 |
| | | | 428/458 |
| 2015/0093905 A1* | 4/2015 | Fujiwara | H01L 21/67028 |
| | | | 438/745 |
| 2015/0335434 A1* | 11/2015 | Patterson | A61F 2/30767 |
| | | | 623/23.5 |
| 2016/0082658 A1 | 3/2016 | Robert et al. | |
| 2017/0327658 A1* | 11/2017 | Moreau | B33Y 10/00 |

FOREIGN PATENT DOCUMENTS

| | | |
|---|---|---|
| FR | 3022250 | 12/2015 |
| WO | 2011145960 | 11/2011 |

\* cited by examiner

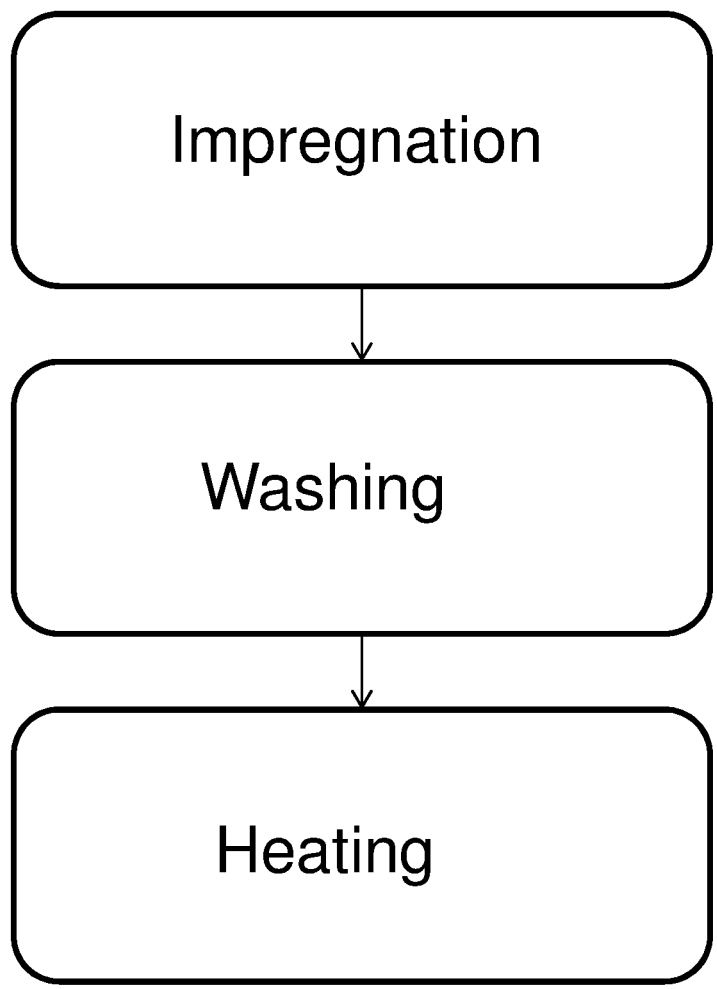

SURFACE TREATMENT METHOD FOR OBJECTS

CROSS REFERENCE TO RELATED APPLICATIONS

This application claims priority to and the benefit of French Application No. 1760026, filed on 24 Oct. 2017, the disclosure of which is incorporated herein by reference in its entirety.

BACKGROUND

1. Field

This disclosed embodiment relates to the field of surface treatment methods for objects, particularly for objects derived from additive manufacturing, also called "3D printing".

More particularly, this disclosed embodiment relates to a physicochemical surface treatment method for plastic objects and particularly objects derived from additive manufacturing techniques.

Objects concerned by this disclosed embodiment contain at least one polymer, for example a polyamide.

2. Brief Description of Related Developments

Additive manufacturing, also called 3D printing, can be used to create objects stratum by stratum without using moulds. It is used particularly for the fast production of plastic parts.

The objects thus produced have a rougher surface than objects obtained by plastic injection. In some special cases, when shaping, their surface is in contact with plastic powder grains or air, rather than with a smooth mould.

This finish is unsatisfactory for some applications: for example an object can be judged visually or by touch as being unattractive due to this effect.

There are several solutions available at the present time, particularly polishing with abrasives, application of varnish/resin or chemical or thermochemical dissolution of the surface of the object followed by resolidification.

At the present time, the latter method consists of leaving the object in contact with vapours of a solvent or a mixture of solvents and then removing it when the rendering is deemed to be acceptable. The most frequently used polymer/solvent pair is ABS (acrylonitrile butadiene styrene) treated with acetone vapours, but other combinations have been put forward.

One polymer used in 3D printing, namely polyamide, has good global chemical resistance making dissolution by solvent vaporised at ambient temperature difficult. For example it is absolutely resistant to acetone. A temperature rise can facilitate the process but there is a risk of creating safety problems dependent on the nature of the solvents used.

SUMMARY

This disclosed embodiment is intended to overcome the disadvantages of prior art by disclosing a method based on immersion in an acid solution then a temperature rise to treat objects containing at least one polymer, for example a polyamide, particularly but not exclusively objects derived from an additive manufacturing method.

To achieve this, this disclosed embodiment in its most general acceptance concerns a surface treatment method of an object, comprising the following steps:
  Immersion of said object in a solution containing an acid or a mixture of acids, and having a pH between 0 and 6, so as to impregnate the surface of said object;
  Removal of said object from said acid solution;
  Heating of said object to a temperature between 50° C. and the melting temperature of the object, until the required gloss and roughness surface properties are obtained.

The method according to this disclosed embodiment has the following technical advantages:
  Unlike classical smoothing methods based on organic solvent, this treatment solves the problem of the chemical resistance of polyamide: due to its molecular nature, polyamide is sensitive to acids (catalysed hydrolysis).
  The surface activated by acid will have a lower melting temperature than the core of the object, thus making it possible to keep the shape of the object during the treatment.
  The melting/solidification cycle enables the surface to reorganise itself, gumming the hollows and bumps under the effect of surface tension and resulting in smoothing of the surface.
  The chemical agent is in liquid form and is applied on the object at ambient temperature, which facilitates placement to a certain extent and reduces safety risks.
  The smoothing method allows:
  An improvement to the surface condition in terms of roughness, the Ra reaches values equal to approximately one micrometre [0.5; 3 µm].
  The matt surface of the unfinished object becomes a full gloss.
  A significant improvement in the flexibility of the material.

Advantageously, said acid solution has a pH of between 0 and 3.

According to one aspect of the disclosed embodiment, said solution comprises one of the following inorganic acids: sulphuric acid, nitric acid, phosphoric acid and hydrochloric acid.

According to one aspect of the disclosed embodiment, the immersion step is improved by applying a heat treatment and/or a mechanical treatment.

According to one alternative, said object is heated to a temperature equal to between 120° C. and the melting temperature of said object.

According to one aspect of the disclosed embodiment, said method also comprises a step of eliminating the surplus liquid in the presence of at least one organic or aqueous solvent.

According to one aspect of the disclosed embodiment, the step of eliminating the surplus liquid follows a mechanical process.

According to one aspect of the disclosed embodiment, the step of eliminating the surplus liquid is done by applying a centrifugal force to said object.

According to one aspect of the disclosed embodiment, the step of eliminating the surplus liquid is done by applying a pressurised gas flow.

Advantageously, said heating step is applied using a forced convection heating system.

Preferably, at least one washing step is done on said object in the presence of a solvent or a mixture of solvents.

Advantageously, said impregnation solution also comprises additives deposited on the surface of the object during said immersion step.

According to one particular aspect of the disclosed embodiment, said method is applied to an object derived from additive manufacturing techniques.

Advantageously, said method is applied to an object including at least one polymer.

According to one particular aspect of the disclosed embodiment, said method is applied to an object made of polyamide.

Advantageously, said immersion step is accompanied by physicomechanical processes conducive to impregnation.

BRIEF DESCRIPTION OF THE FIGURES

The disclosed embodiment will be better understood after reading the following purely explanatory description of one aspect of the disclosed embodiment with reference to the figures in which:

FIG. 1 illustrates the different steps in the method according to this disclosed embodiment,

DETAILED DESCRIPTION

This disclosed embodiment relates to a surface treatment method of an object, for example made of polyamide, particularly but non-exclusively derived from additive manufacturing techniques.

The method according to this disclosed embodiment comprises the following steps:

Immersion of the object in a solution containing an acid or a mixture of acids, and having a pH between 0 and 6, so as to impregnate the surface of said object;

Removal of the object from said acid solution;

Heating of the object to a temperature between 50° C. and the melting temperature of the object, until the required gloss and roughness surface properties are obtained.

FIG. 1 illustrates the different steps in the method according to this disclosed embodiment: impregnation, drying, heating and cooling, these different steps relating to the object that, in one aspect of the disclosed embodiment, is derived from additive manufacturing techniques.

In one aspect of the disclosed embodiment, said method is applied to an object made of polyamide.

In one aspect of the disclosed embodiment, the acid solution has a pH of between 0 and 3.

In one aspect of the disclosed embodiment, the acid is an inorganic acid, and in one embodiment the acid is chosen from among the group including sulphuric acid, nitric acid, phosphoric acid and hydrochloric acid.

In one aspect of the disclosed embodiment, said object is heated to a temperature equal to between 120° C. and the melting temperature of said object.

In one aspect of the disclosed embodiment, the method according to this disclosed embodiment also comprises a step in which surplus liquid is eliminated.

In one aspect of the disclosed embodiment, the step of eliminating the surplus follows a mechanical process.

In another aspect of the disclosed embodiment, the step of eliminating the surplus is done by applying a centrifugal force to said object.

In another aspect of the disclosed embodiment, the step of eliminating the surplus is done by applying a pressurised gas flow.

In one aspect of the disclosed embodiment, the heating step is implemented using a forced convection heating system, providing better uniformity of heating.

In one aspect of the disclosed embodiment, the impregnation solution also comprises additives, and according to one embodiment, additives are deposited on the surface of the object during the immersion step, which confers additional properties on the surface of the object.

In one aspect of the disclosed embodiment, at least one washing step is done on said object in the presence of a solvent or a mixture of solvents.

One particular application of this disclosed embodiment lies in objects comprising a polyamide, but it is also applicable to objects comprising other polymers such as for example polyethylene, polyvinyl chloride, polyurethanes, polyesters, polypropylenes and polyethylenes.

The disclosed embodiment is described above as an example. It will be understood that an expert in the subject will be capable of making different alternatives to the disclosed embodiment without going outside the framework of the patent.

What is claimed is:

1. Surface treatment method for an object, characterized in that it comprises the following steps:
   immersion of said object in a solution containing an acid or a mixture of acids, and having a pH between 0 and 3, so as to impregnate the surface of said object and activate the surface so as to define a transition between the surface and a core of said object characterized in that the surface has a lower melting temperature than the core of the object;
   removal of said object from said solution;
   heating of said object, dependent on formation of the transition, to a temperature between 120° C. and the melting temperature of the surface of said object, effecting melting the activated surface until the required gloss and roughness surface properties are obtained.

2. Surface treatment method for an object according claim 1, characterised in that said solution comprises one of the following inorganic acids: sulphuric acid, nitric acid, phosphoric acid and hydrochloric acid.

3. Surface treatment method for an object according to claim 1, characterised in that the immersion step is improved by applying a heat treatment and/or a mechanical treatment.

4. Surface treatment method for an object according to claim 1, characterised in that it also comprises a step of eliminating surplus liquid in the presence of at least one organic or aqueous solvent.

5. Surface treatment method for an object according to claim 4, characterised in that the step of eliminating the surplus liquid follows a mechanical process.

6. Surface treatment method for an object according to claim 4, characterised in that the step of eliminating the surplus liquid is done by applying a centrifugal force to said object.

7. Surface treatment method for an object according to claim 4, characterised in that the step of eliminating the surplus liquid is done by applying a pressurised gas flow.

8. Surface treatment method for an object according to claim 1, characterised in that said heating step is performed using a forced convection heating system.

9. Surface treatment method for an object according to claim 1, characterised in that at least one washing step is done on said object in the presence of a solvent or a mixture of solvents.

10. Surface treatment method for an object according to claim 1, characterised in that said solution also comprises additives deposited on the surface of the object during said immersion step.

11. Surface treatment method for an object according to claim 1, characterised in that it is applied to an object derived from additive manufacturing techniques.

12. Surface treatment method for an object according to claim 1, characterised in that it is applied to an object including at least one polymer.

13. Surface treatment method for an object according to claim 12, characterised in that it is applied to an object made of polyamide.

14. Surface treatment method for an object according to claim 1, characterised in that said immersion step is accompanied by physicomechanical processes conducive to impregnation.

\* \* \* \* \*